Figure 1:
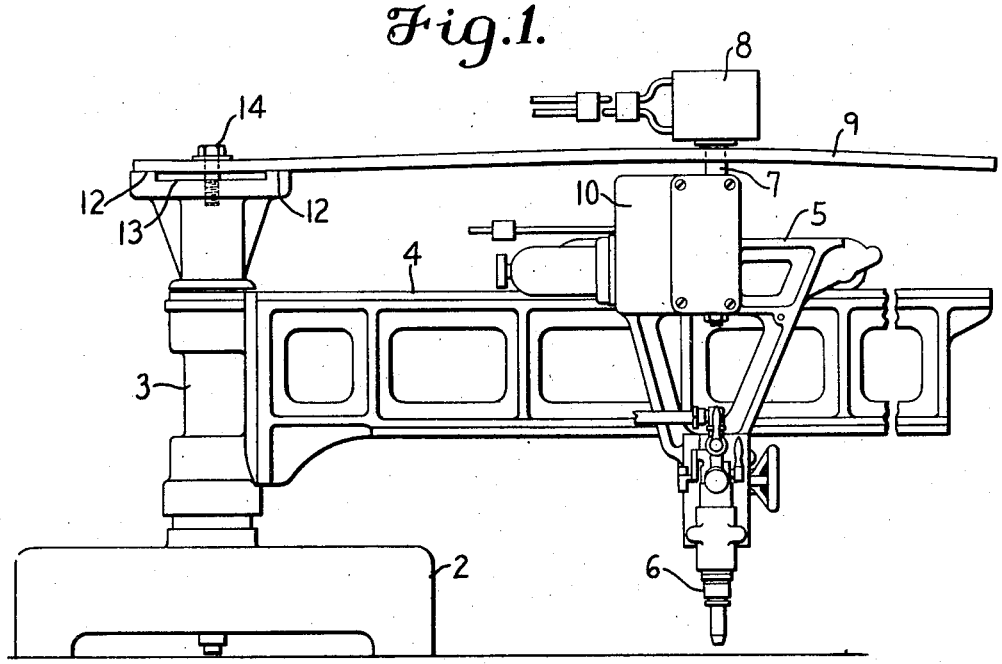

Aug. 2, 1932.     J. L. ANDERSON     1,869,836
CUTTING TORCH MACHINE
Filed Sept. 2, 1931

Patented Aug. 2, 1932

1,869,836

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

CUTTING TORCH MACHINE

Application filed September 2, 1931. Serial No. 560,707.

The invention relates to cutting torch apparatus of that type in which the torch is carried by a suitable frame or movable support permitting of universal movement in a plane, the torch being guided to travel in any desired path of changing direction by the cooperation of a follower or roller with a cam or template. The template may be made of sheet or plate metal cut out to provide a boundary of the desired contour to serve as a track for the follower, an advantageous form of the follower being a magnetic, motor-driven roller which will adhere to the edge or boundary. In the machines which it is the purpose of the invention to improve, the template is usually supported at one end in a cantilever fashion. It may be supported at its opposite ends, though that is usually not convenient. In either event, and more especially in the case of a cantilever template, the template will sag, this effect being the more pronounced with templates of considerable size. The deflection causes distortion in the design to be executed by the follower and torch, which, if accuracy is required, should be compensated for in the design of the template. Factors complex in their nature are thus introduced into the template design. In addition to the gravitational deflecting forces, the pull of the electromagnet itself often affects the templates. Since the roller moves substantially in a single plane of movement at all times, these deflections, if they become of sufficient magnitude, may and sometimes do cause portions of the template to bear against the follower or the frame in a way that interferes with the operation.

The object of the invention is to provide a means for supporting the cams or templates of cutting apparatus of the kind designated in such manner that deflection of the templates is counteracted sufficiently to overcome or greatly mitigate former difficulties. The design of the template may, accordingly, be the same or substantially the same as that of a template which would remain truly planar in use. Templates may be supported from one region in this manner to have an average deflection so small that the actual distortion may be ignored, and that there will be no possibility of the template hampering the free and uniform movement of the follower and torch.

The invention involves the application of the supported end of the template to the column or other support of the torch-cutting machine, by securing and seating means which preferably cooperate to bow or spring this portion of the template, not cooperating with the follower, in a manner to impart to the freely extending part, which does guide the roller, a counter deflection which virtually neutralizes the deflection that would otherwise exist. The specific method of stiffening, straightening or counter-bowing the template from its region of support may be varied.

Figure 2:
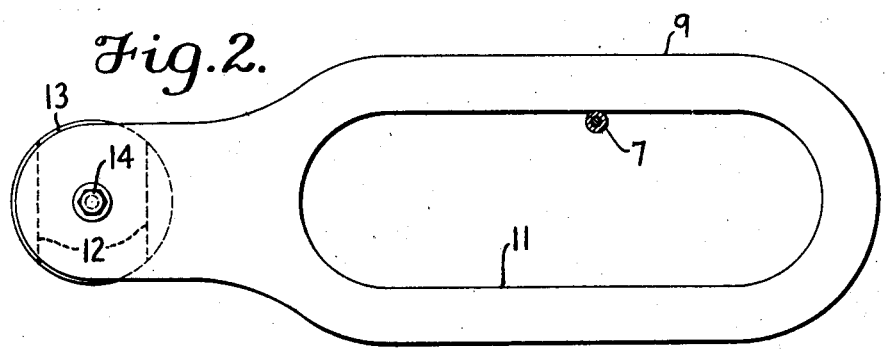

In the accompanying drawing, forming part hereof:

Fig. 1 is an elevation of an illustrative form of universal gas cutting machine with a template supported in accordance with the invention; and Fig. 2 is a partial plan view of the apparatus.

A machine of the form disclosed in patent 1,365,021, dated January 11, 1921, has been selected for purpose of illustration.

The base 2 supports column 3, on which is swung the radial arm 4. On the swinging arm a carriage 5 can run in and out, this carriage having the torch 6 and the magnetic roller 7. In this particular machine the roller is in perpendicular alinement over the torch. The effect is that the torch and roller are supported mechanically for universal movement in a plane, the motions of the roller or tracer being reproduced by the movement of the oxyacetylene cutting torch in relation to the work. Various other plans of apparatus are known for accomplishing the same general purpose.

An electromagnet 8 energizes the roller so that it will adhere to the inner boundary of the template 9, the roller being driven from a governor-controlled electric motor 10 through appropriate gearing.

The template is of the kind usually termed a cam, consisting of a plate of steel of appropriate form, cut out in the interior to provide a track 11 for adhesion and guidance of the side of the roller. Different cams are laid out and made for different production operations, and the difficulty and expense of making them is a consideration.

The cam is seated at its inner end on two seats 12 separated by a recess 13. In the illustrated construction the cam projects out over the universally movable frame carrying the torch and magnet roller, and the seating provision is on top of the column 3, these matters being subject to variation depending on the particular design of machine. This end of the cam or template has a hole between the seats or projections 12, through which to pass a cap-screw 14 which is screwed into a tapped hole in the head of the column between the seats. Depending upon the extent to which this screw is turned in, the short span of the template plate between the seats will be bowed, and this bowing will tend to produce a reverse or upward bowing in the cantilever arm of the template. The reverse bowing of the template proper is indicated with some exaggeration and without any attempt to reproduce a specific condition, but it will be seen that the general effect is to stiffen the arm and keep it approximately on a level without any decided tendency to droop on the whole below the level of the support.

The flexing in the body of the template need be so little that the alteration in the guiding circuit, as compared with its state in the plane in which it is made, is inconsequential or may be easily allowed for. Any dropping down of the template on the parts beneath is obviated.

In the illustrated machine the electromagnet is over the template, but in other instances it is below and then the magnetic pull adds to the influence of gravity on the arm. By adjustment of the screw 14, the neutralization of the template can be regulated in accordance with conditions, such as the location of the magnet and the length, weight and flexibility of the template. It is desirable to be able to make the template of as thin material as possible.

Various modifications in the invention and in the mode of applying it to machines of the art in question will suggest themselves, and it is the intention in the claims to point out the invention generally as well as specifically and to cover matters of scope falling between.

I claim:

1. In cutting torch apparatus, in which a torch and a follower on a movable frame are guided for universal movement in a plane by cooperation of the follower with a template plate, the provision of means for stressing the template plate at its region of support so as to oppose natural deflection of the plate.

2. In cutting torch apparatus, in which a torch and a follower on a movable frame are guided for universal movement in a plane by cooperation of the follower with a template plate, the provision of means for stressing the template plate at its region of support so as to oppose natural deflection of the plate, said means comprising spaced seats and a device for variably bowing the portion of the plate between the seats to counter-bow the projecting body of the template which contains the guide for the follower.

3. In cutting torch apparatus having a column, a frame swung on said column and carrying a torch and a follower in such manner that the torch will execute movements of changing direction in a plane similar to the movements of the follower, and a template overhanging the frame; a seat on top of said column, and means cooperating with said seat for adjustably securing one end of the template so as to overcome tendency of the template to sag.

4. In a cutting machine such as one comprising a column, a frame swung on the column, a cutting torch and an electromagnetic roller on the same portion of the frame, a follower directly above the torch, and a template for guiding the magnet roller, the novelty consisting in an adjustable clamp for affixing the template to the head of the column and for stressing the template so as to hold its outstanding guide portion virtually planar.

JAMES L. ANDERSON.